United States Patent [19]
Kanekiyo et al.
[11] Patent Number: 4,505,749
[45] Date of Patent: Mar. 19, 1985

[54] METHOD OF FORMING COLOR IMAGES

[75] Inventors: Kazue Kanekiyo, Mitaka; Masatsune Kobayashi; Yasumasa Yokoyama, both of Yokohama; Tsuyoshi Eida, Ichikawa; Tomoko Komori, Machida; Shoji Koike, Yokohama, all of Japan

[73] Assignee: Canon Kabushiki Kaisha, Tokyo, Japan

[21] Appl. No.: 507,580

[22] Filed: Jun. 24, 1983

[51] Int. Cl.$^3$ .............................................. C09D 11/02
[52] U.S. Cl. ........................................ 106/20; 106/22
[58] Field of Search .................................. 106/20, 22

[56] References Cited

U.S. PATENT DOCUMENTS

| | | | |
|---|---|---|---|
| 3,870,528 | 3/1975 | Edds et al. | 106/31 |
| 4,062,688 | 12/1977 | Schumacher | 106/20 |
| 4,382,262 | 5/1983 | Savit | 106/20 |

*Primary Examiner*—Paul Lieberman
*Assistant Examiner*—Amelia B. Yarbrough
*Attorney, Agent, or Firm*—Fitzpatrick, Cella, Harper & Scinto

[57] ABSTRACT

In a process for forming color images using more than one kind of color ink including black ink, the dyes in the color ink used have similar chromatographic characteristics. Preferably any difference of the Rf value of paper chromatography between any of the two dyes is not more than 0.30.

5 Claims, No Drawings

METHOD OF FORMING COLOR IMAGES

BACKGROUND OF THE INVENTION

1. Field of the Invention

The present invention relates to a process for forming color images using plural kinds of color ink including black ink, in a recording system such as a pen recording system and an ink jet recording system.

2. Description of the Prior Art

Lately researches and developments have extensively been carried out concerning color graphic printers and full color digital copying machines using a pen recording system or an ink jet recording system. In the above-mentioned machines, multicolored images are usually formed by using mainly cyan ink, magenta ink, and yellow ink (suitably adding black ink), and overlapping and mixing more than one kind of ink corresponding to necessity. In forming multicolored images using plural kinds of color ink, each dye contained in cyan-, magenta-, or yellow-ink are required to exhibit right absorption spectra as precisely as possible, and to have excellent color reproducibility when adhered to a recording medium such as paper and the like.

Moreover, when a color image is formed by overlapping more than one kind of color ink, each color ink must necessarily be prepared so that the overlapped and synthesized images may reproduce the color tone of the original image with fidelity on the recording medium.

Heretofore efforts have been made from the above point of view to prepare each ink to obtain desired color images by combining these inks based on theoretical calculations. However, it has been extremely difficult to reproduce practically the color on a recording medium as is theoretically predicted.

SUMMARY OF THE INVENTION

An object of the present invention is to provide a method for consistently obtaining color images of high quality which reproduce the color of the original with high fidelity by using more than one kind of color ink.

According to an aspect of the present invention, there is provided a process for forming color images using more than one ink selected from a plurality of color ink including black inks, characterized in that there are used more than one kind of ink, the dyes contained in said color ink having similar chromatographic characteristics.

DETAILED DESCRIPTION OF THE PREFERRED EMBODIMENTS

The present invention is illustrated below in detail using examples.

The fundamental principle in this invention is to select color ink (black ink is included therein) to be combined for forming color images based on their chromatographic characteristics. The intention is accomplished without separation of different color dyes by preparing ink having similar chromatographic characteristics.

As a measure of chromatographic characteristics of dyes in the present invention, a relative mobility value of paper chromatography is taken up. The relative mobility is defined below.

The method for determining a relative mobility of dyes

The dye to be tested is dissolved in a mixed solvent of water and diethylene glycol in sufficient amounts to provide a dye concentration of 5 percent by weight. The mixing ratio of water and diethylene glycol is 55:45 in parts by weight.

A 2 microliter sample of the test solution is charged to a test strip at a point 3 centimeters from a solvent reservoir containing the mixed solvent described above. The amount of solvent in the reservoir is not critical providing sufficient amounts are present to carry out the procedure to completion. The test strip is a chromatography paper, Toyo Filter Paper No. 50, (trademark) supplied by Toyo Kagaku Sangyo, K.K. having a basis weight in g/m$^2$ of 140, a thickness of 0.25 mm, a water absorption speed of 6.5 cm in 30 minutes, an ash content of 0.17 percent and a smooth surface. If desired, a equivalent can be substituted, such as Whatman chromatography paper, grade 20 CHROM, (trademark) having a basis weight in g/m$^2$ of 93, a thickness of 0.16 mm and a water absorption speed of 8.5 cm in 30 minutes. The Whatman 20 CHROM paper exhibits typical Rf values for glycine of 20 and for leucine of 67 in a butanol/acetic acid solvent system for ascending, one-dimensional chromatography at 17 degrees cenitgrade, as noted in Whatman Bulletin No. 201, published in 1977 and expressly incorporated herein by reference.

The test spot so charged is developed employing the mixed solvent for 480 minutes in a conventional manner for ascending, one dimensional chromatography at a temperature of 25° C. centigrade, and the distance (A) from the charged point traveled by the developing solvent and the distance (B) from the charged point traveled by the dye are measured. The relative mobility of the dye is defined as B/A=Rf.

The inventors have found that in practice satisfactory reproducibility of color can be obtained if the difference of Rf value of the dye in each color ink used in combination on the same recording material is about 0.30 or less.

It has been also found that high-quality images having color reproducibility nearly equal to the calculated value are formed if the difference of the relative mobility value between any two dyes contained in the ink is not more than about 0.20.

Under such conditions, the rate of the penetration and the diffusion of each color ink into a recording medium is approximately equal to each other so that any slight difference is not visually discerned.

Hence no color irregularity nor color deviation is found with the dyes having the Rf value satisfying the above mentioned condition, even when more than one kind of ink are combined and overlapped on one recording medium.

For compounding and preparing color ink used in the present invention, various kinds of water soluble dye giving color of cyan, magenta, yellow and black etc. (especially acid dye or direct dye) may be useful.

The value in the parentheses added to the names of the dyes illustrated below show the relative mobility values (Rf values) obtained by the procedure mentioned above.

| Cyan dyes | |
|---|---|
| C.I. Acid Blue 254 | (0.94) |
| C.I. Acid Blue 1 | (0.99) |
| C.I. Acid Blue 9 | (0.99) |
| C.I. Acid Blue 290 | (0.82) |
| C.I. Acid Blue 103 | (0.92) |
| C.I. Acid Blue 40 | (0.97) |
| C.I. Acid Blue 127 | (0.97) |
| C.I. Direct Blue 86 | (0.86) |

-continued

| | |
|---|---|
| C.I. Acid Blue 113 | (0.96) |
| C.I. Acid Blue 120 | (0.91) |
| C.I. Direct Blue 199 | (0.84) |
| Magenta dyes | |
| C.I. Acid Red 276 | (0.74) |
| C.I. Acid Red 274 | (0.95) |
| C.I. Direct Red 81 | (0.80) |
| C.I. Acid Red 289 | (0.99) |
| C.I. Acid Red 122 | (0.98) |
| C.I. Acid Red 155 | (0.96) |
| C.I. Acid Red 161 | (0.86) |
| C.I. Acid Red 131 | (0.96) |
| C.I. Acid Red 249 | (0.94) |
| C.I. Acid Red 35 | (0.95) |
| C.I. Acid Red 106 | (0.99) |
| C.I. Acid Red 264 | (0.97) |
| C.I. Acid Red 254 | (0.99) |
| C.I. Acid Red 52 | (0.91) |
| C.I. Acid Red 27 | (0.91) |
| C.I. Acid Red 265 | (0.91) |
| C.I. Acid Red 257 | (0.79) |
| C.I. Acid Red 42 | (0.93) |
| C.I. Acid Red 111 | (0.68) |
| C.I. Acid Red 145 | (0.92) |
| Yellow dye | |
| C.I. Acid Yellow 23 | (0.90) |
| C.I. Acid Yellow 29 | (0.82) |
| C.I. Direct Yellow 142 | (0.76) |
| C.I. Acid Yellow 38 | (0.85) |
| C.I. Acid Yellow 65 | (0.85) |
| C.I. Direct Yellow 12 | (0.87) |
| Black dye | |
| C.I. Acid Black 24 | (0.93) |
| C.I. Acid Black 26 | (0.90) |
| C.I. Acid Black 107 | (0.85) |
| C.I. Acid Black 110 | (0.86) |
| C.I. Acid Black 52:1 | (0.97) |
| C.I. Acid Black 139 | (0.90) |
| C.I. Direct Black 154 | (0.74) |
| C.I. Direct Black 19 | (0.77) |
| C.I. Food Black 2 | (0.92) |

The dyes illustrated above may usually be incorporated in each color ink in an amount of from 0.5 to 30% by weight, more preferably from 1 to 10% by weight.

In preparing each color ink used in the present invention, a liquid ingredient may be jointly used along with the dyes. As such ingredients, there may be mentioned water or a mixture of water with various water soluble organic solvents. Examples of water soluble organic solvents are: aliphatic alcohols having one to four carbon atoms such as methyl alcohol, ethyl alcohol, n-propyl alcohol, isopropyl alcohol, n-butyl alcohol, sec-butyl alcohol, tert-butyl alcohol, isobutyl alcohol and the like; amides such as dimethyl formamide, dimethyl acetamide and the like; ketones or ketone alcohols such as acetone, diacetone alcohols and the like; ethers such as tetrahydrofuran, dioxane, and the like; nitrogen containing heterocyclic ketones such as N-methyl-2-pyrrolidone, 1,3-dimethyl-2-imidazolidinone and the like; polyalkylene glycols such as polyethylene glycol, polypropylene glycol, and the like; alkylene glycols containing an alkylene group of two to six carbon atoms such as ethylene glycol, propylene glycol, butylene glycol, triethylene glycol, 1,2,6-hexanetriol, thiodiglycol, hexylene glycol, diethylene glycol, and the like; glycerine; lower alkyl ethers of polyhydric alcohols such as ethylene glycol methyl ether, diethylene glycol methyl (or ethyl) ether, triethylene glycol monomethyl (or ethyl) ether, and the like.

Among many such water soluble organic solvents, polyhydric alcohols such as diethylene glycol, lower alkyl ether of polyhydric alcohols such as triethylene glycol monomethyl (or ethyl) ether, and the like are especially preferable as a wetting agent for ink.

Each ink used in the present invention is basically prepared from said ingredients. However, various additives known heretofore may be added. As an additive, there are mentioned viscosity modifiers such as polyvinyl alcohol, cellulose and its derivatives, water soluble resin and the like; various surfactants of cation-, anion-, or nonion-type surface tension modifiers such as diethanolamine, triethanolamine and the like; PH modifiers using buffering agents.

Moreover, for preparing ink used for ink jet recording wherein the ink droplets are charged, a specific resistance modifier such as lithium chloride, ammonium chloride, sodium chloride and other inorganic salts may be used. Urea and thiourea may also be used preferably as a water retention characteristic modifier. In the recording system wherein ink is discharged by heat energy, the thermal properties of the ink may be adjusted (such as specific heat, thermal expansion coefficient, thermal conductivity, etc.).

As a receiving member of color images formed with ink in other words, as a recording medium, there may be used sheets or films of a material such as paper, cloth, wood and resin and the like, and in special cases glass or metal. Among paper, in addition to plain paper, coated paper is preferable which has a coating of water soluble resin on base paper whether including white pigment or not.

When a recording medium having insufficient ink absorbency is to be used, it is desirable to improve its ink absorbency by treatment such as rendering it porous.

The embodiment of the effect of the present invention is illustrated below:

EXAMPLE 1

Each composition is mixed by stirring, and filtered to prepare yellow-, magenta-, and cyan-ink.

| | |
|---|---|
| Yellow ink (composition): | |
| C.I. Direct Yellow 12 | 2 weight parts |
| Deionized water | 68 weight parts |
| Diethylene glycol | 30 weight parts |
| Magenta ink (composition): | |
| C.I. Acid Red 276 | 2 weight parts |
| Deionized water | 68 weight parts |
| Diethylene glycol | 30 weight parts |
| Cyan ink (composition): | |
| C.I. Direct Blue 86 | 2 weight parts |
| Deionized water | 68 weight parts |
| Diethylene glycol | 30 weight parts |

These three kinds of ink were ejected respectively onto the recording medium shown below responding to the image signal, by means of an ink-jet head of an on-demand type equipped with a piezoelectric vibrator (diameter of the discharging orifice: 50μ; driving potential of piezoelectric vibrator: 60 v; its frequency: 4 KHz) to form color images consisting of seven colors.

All of the color images obtained had bright color tones, and no color irregularity was observed at all even in parts of mixed color.

| Recording Medium (Trade Name) | Classification | Manufacturer |
|---|---|---|
| Ginkan | Woodfree Paper | Sanyokokusaku Pulp |

-continued

| Recording Medium (Trade Name) | Classification | Manufacturer |
|---|---|---|
| | | Co., Ltd. |
| Seven Stars | Woodfree Paper | Hokuetsu Paper Mills Ltd. |
| Hakubotan | Middle-Quality Paper | Honshu Paper Mfg. Co., Ltd. |
| Toyo Filter Paper No. 4 | Nonsized Paper | Toyo Kagaku Sangyo K.K. |

EXAMPLE 2

A coating material was prepared by grinding and mixing 100 weight parts of fine powdery silicic acid and 10 weight parts of polyacrylamide binder. The coating material was applied onto one side of a substrate paper of the basis weight of 60 $g/m^2$ at the application rate of 3 $g/m^2$. It was dried to yield coated paper.

Four kinds of color ink including yellow-, magenta-, cyan-, and black-ink were prepared by stirring and filtering the compositions below respectively.

| | |
|---|---|
| Yellow ink (composition) | |
| C.I. Acid Yellow 65 | 4 weight parts |
| Deionized water | 60 weight parts |
| N—methyl-2-pyrrolidone | 16 weight parts |
| Diethylene glycol | 20 weight parts |
| Magenta ink (composition) | |
| C.I. Acid Red 161 | 4 weight parts |
| Deionized water | 60 weight parts |
| N—methyl-2-pyrrolidone | 16 weight parts |
| Diethylene glycol | 20 weight parts |
| Cyan ink (composition) | |
| C.I. Acid Blue 290 | 4 weight parts |
| Deionized water | 60 weight parts |
| N—methyl-2-pyrrolidone | 16 weight parts |
| Diethylene glycol | 20 weight parts |
| Black ink (composition) | |
| C.I. Acid Black 107 | 4 weight parts |
| Deionized water | 60 weight parts |
| N—methyl-2-pyrrolidone | 16 weight parts |
| Diethylene glycol | 20 weight parts |

Each of the four kinds of ink was ejected onto said coated paper through an ink jet head of an on-demand type equipped with a piezoelectric vibrator (diameter of the discharge orifice: 50μ; driving potential of the piezoelectric vibrator; 60 V; frequency: 4 KHz) responding to image signals based on the specified full-color originals.

Four juxtaposed ink jet heads were reciprocated relative to the coated paper for each line, each head ejecting ink.

Full color photograms where obtained on the coated paper with clear color and with excellent color reproducibility.

EXAMPLES 3-15

The procedure of Example 2 was followed excpet that the dyes in the ink (composition) were replaced by the ones shown in the table below, and the ink-jet recording were carried out in full color. In every case, full color photograms of high quality were reproduced as in Example 2.

| Example No. | Color of Ink | Dyes |
|---|---|---|
| 3 | Yellow | C.I. Acid Yellow 23 |
| | Magenta | C.I. Acid Red 274 |
| | Cyan | C.I. Acid Blue 254 |
| | Black | C.I. Acid Black 24 |
| 4 | Yellow | C.I. Acid Yellow 23 |
| | Magenta | C.I. Acid Red 155 |
| | Cyan | C.I. Acid Blue 1 |
| | Black | C.I. Acid Black 24 |
| 5 | Yellow | C.I. Acid Yellow 29 |
| | Magenta | C.I. Acid Red 131 |
| | Cyan | C.I. Acid Blue 103 |
| | Black | C.I. Acid Black 26 |
| 6 | Yellow | C.I. Acid Yellow 29 |
| | Magenta | C.I. Acid Red 35 |
| | Cyan | C.I. Acid Blue 40 |
| | Black | C.I. Acid Black 26 |
| 7 | Yellow | C.I. Acid Yellow 38 |
| | Magenta | C.I. Acid Red 264 |
| | Cyan | C.I. Acid Blue 127 |
| | Black | C.I. Acid Black 110 |
| 8 | Yellow | C.I. Acid Yellow 38 |
| | Magenta | C.I. Acid Red 52 |
| | Cyan | C.I. Acid Blue 9 |
| | Black | C.I. Acid Black 110 |
| 9 | Yellow | C.I. Direct Yellow 12 |
| | Magenta | C.I. Acid Red 257 |
| | Cyan | C.I. Direct Blue 86 |
| | Black | C.I. Acid Black 52:1 |
| 10 | Yellow | C.I. Direct Yellow 12 |
| | Magenta | C.I. Acid Red 42 |
| | Cyan | C.I. Acid Blue 113 |
| | Black | C.I. Acid Black 52:1 |
| 11 | Yellow | C.I. Acid Yellow 23 |
| | Magenta | C.I. Acid Red 145 |
| | Cyan | C.I. Acid Blue 120 |
| | Black | C.I. Acid Black 139 |
| 12 | Yellow | C.I. Acid Yellow 23 |
| | Magenta | C.I. Acid Red 27 |
| | Cyan | C.I. Direct Blue 86 |
| | Black | C.I. Acid Black 139 |
| 13 | Yellow | C.I. Direct Yellow 142 |
| | Magenta | C.I. Direct Red 81 |
| | Cyan | C.I. Direct Blue 199 |
| | Black | C.I. Direct Black 19 |
| 14 | Yellow | C.I. Direct Yellow 142 |
| | Magenta | C.I. Acid Red 257 |
| | Cyan | C.I. Direct Blue 199 |
| | Black | C.I. Direct Black 154 |
| 15 | Yellow | C.I. Direct Yellow 12 |
| | Magenta | C.I. Acid Red 52 |
| | Cyan | C.I. Acid Blue 103 |
| | Black | C.I. Food Black 2 |

EXAMPLE 16

Ten weight parts of 50 weight % solution of acrylic resin (SKY-1 manufactured by Toa Gosei Chemical Industry Co., Ltd.) in toluene, 60 weight parts of methyl ethyl ketone, and 30 weight parts of 1μ particles of 13X type synthetic zeolite (Molecular Sieve manufactured by U.C.C. Co.) were mixed and ground with a ball mill for three days. The resulting mixture was applied onto a mirror-polished plate of stainless steel in the thickness of 1 mm with a coating rod bar and was dried.

The dried film was peeled off the stainless steel plate. The film was immersed in citric acid solution, pH of which had been adjusted to 3, and then it was washed with water and dried to obtain an opaque porous film sheet.

On one side of this porous film sheet, the ink jet recording was made to form a color image consisting of seven colors using the same ink and apparatus as in example 1.

Then the sheet was pressed by means of a commercial smoothing iron with the surface temperature adjusted to about 150° C., and the sheet was melted. When cooled, the sheet became transparent.

The color image on the sheet thus made transparent consisted of clear colors and had excellent color reproducibility. The projection of the sheet through an overhead projector gave a display of color image of clear tone.

We claim:

1. A process for forming color images by overlap printing using more than one color ink selected from a plurality of color inks containing dyes, said plurality including black ink, wherein the dyes contained in said more than one color ink have similar chromatographic relative mobilities as measured by the Rf values.

2. A process for forming color images according to claim 1, wherein said dyes are water soluble.

3. A process for forming color images according to claim 1, wherein the maximum difference between the chromatographic relative mobility of any two of said dyes in said ink is not more than 0.30 as measured by the Rf values.

4. A process for forming color images according to claim 1, wherein the maximum difference between the chromatographic relative mobility of any two of said dyes in said ink is not more than 0.20 as measured by the Rf values.

5. A process for forming color images according to claim 1, wherein said inks are water soluble.

* * * * *